Jan. 6, 1959     B. R. THIELE     2,867,104
AUTOMATIC LAUNDRY MACHINE
Filed Jan. 5, 1954     10 Sheets-Sheet 3
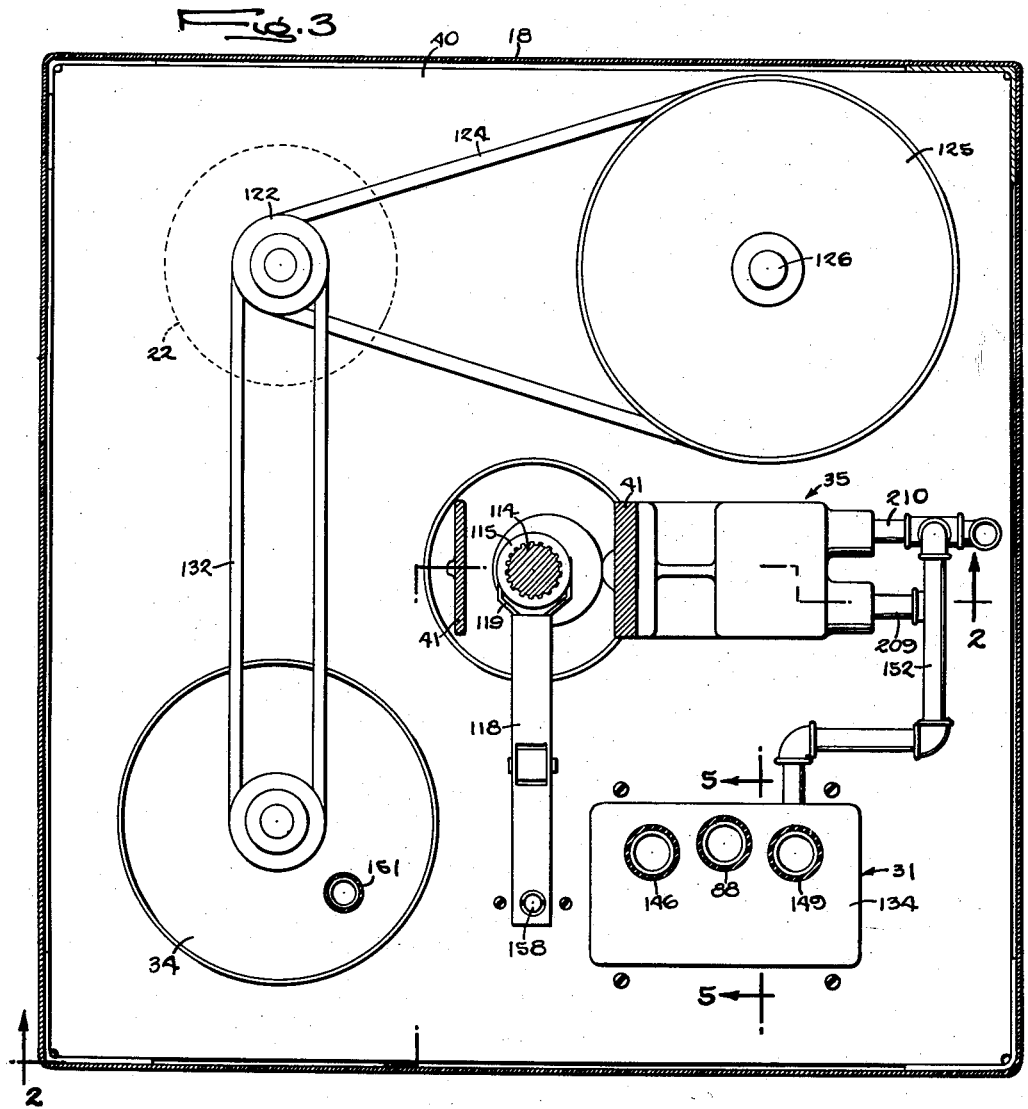
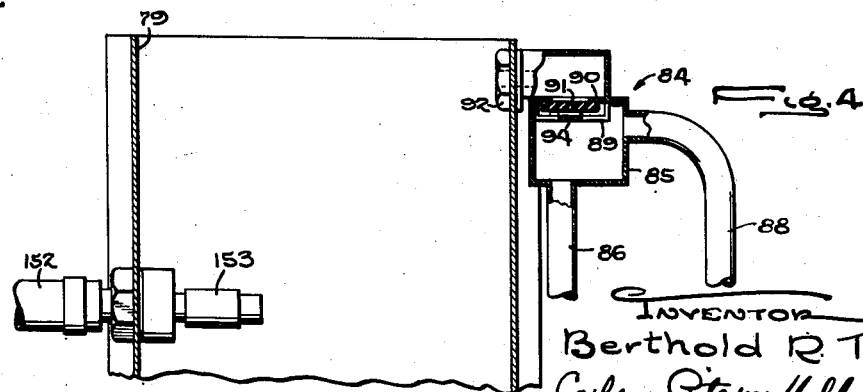
INVENTOR
Berthold R. Thiele
ATTORNEYS

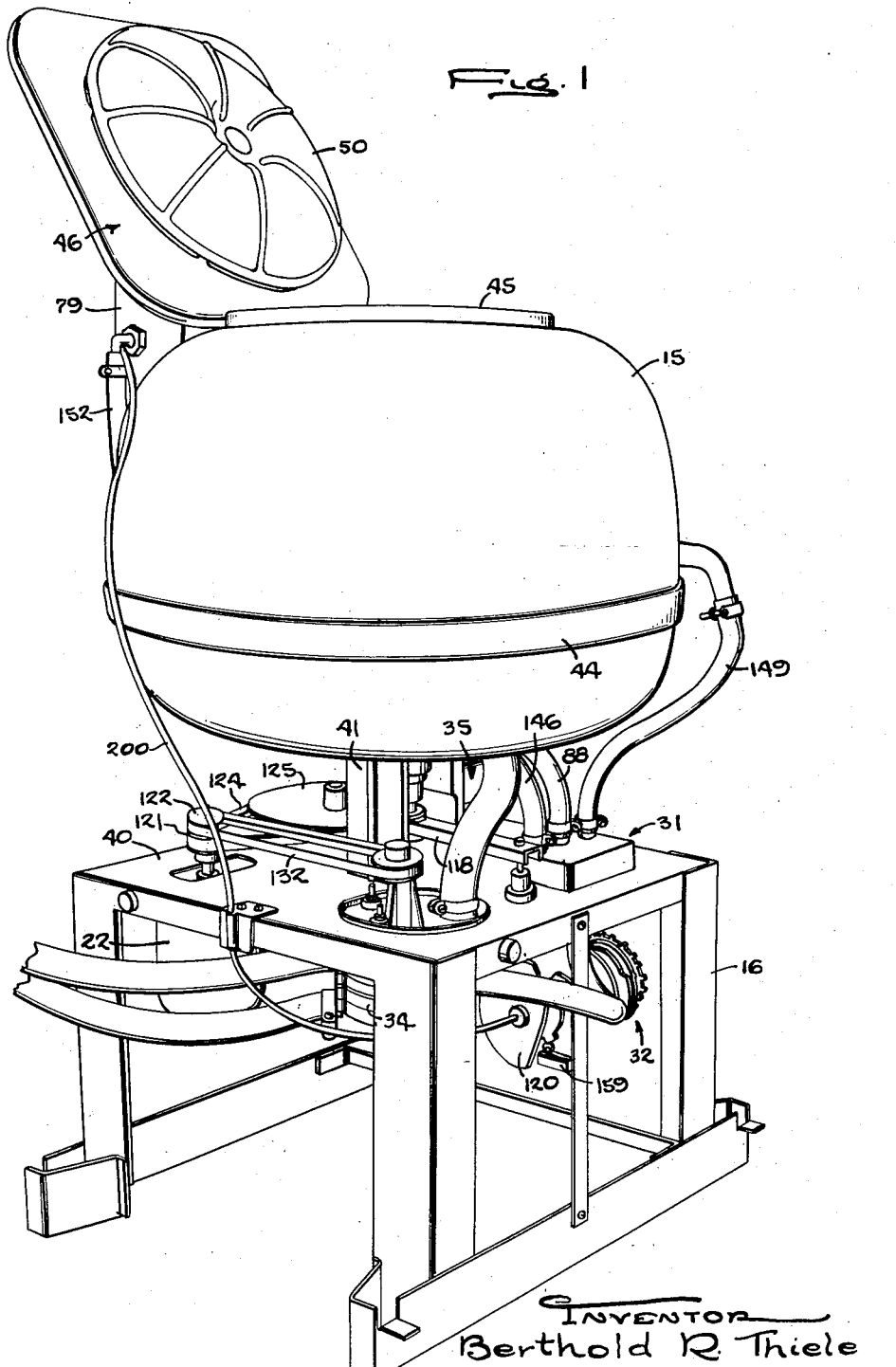

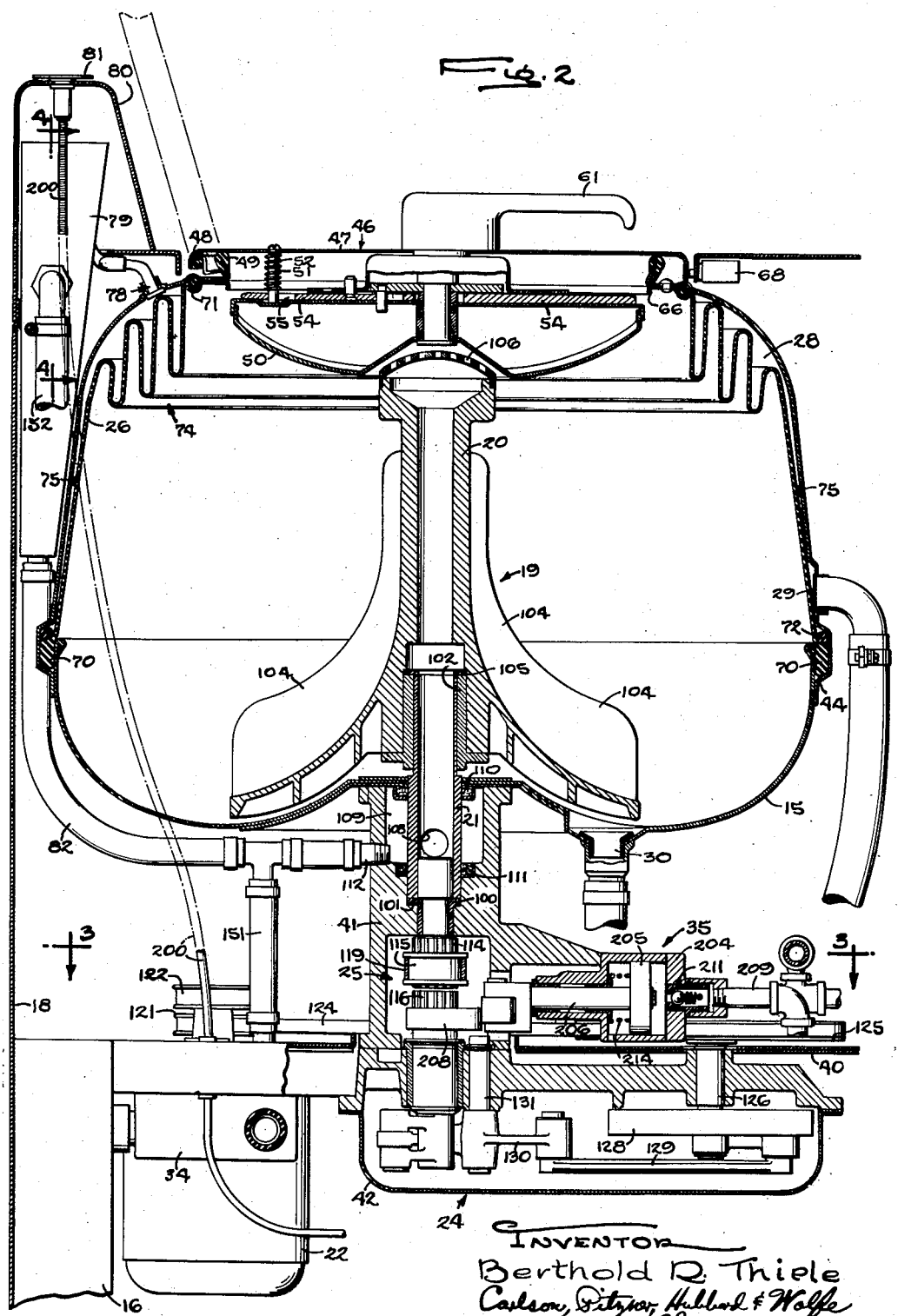

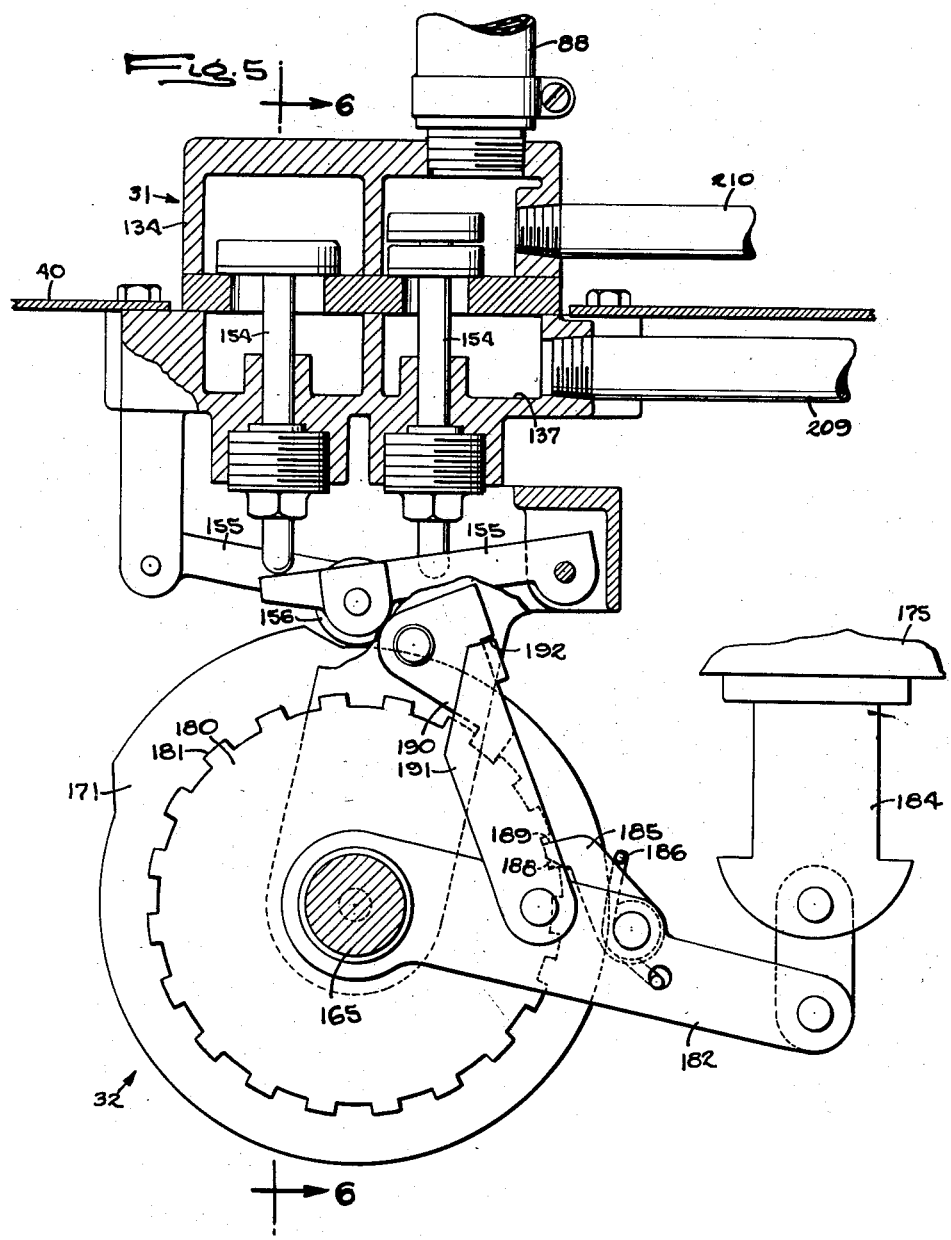

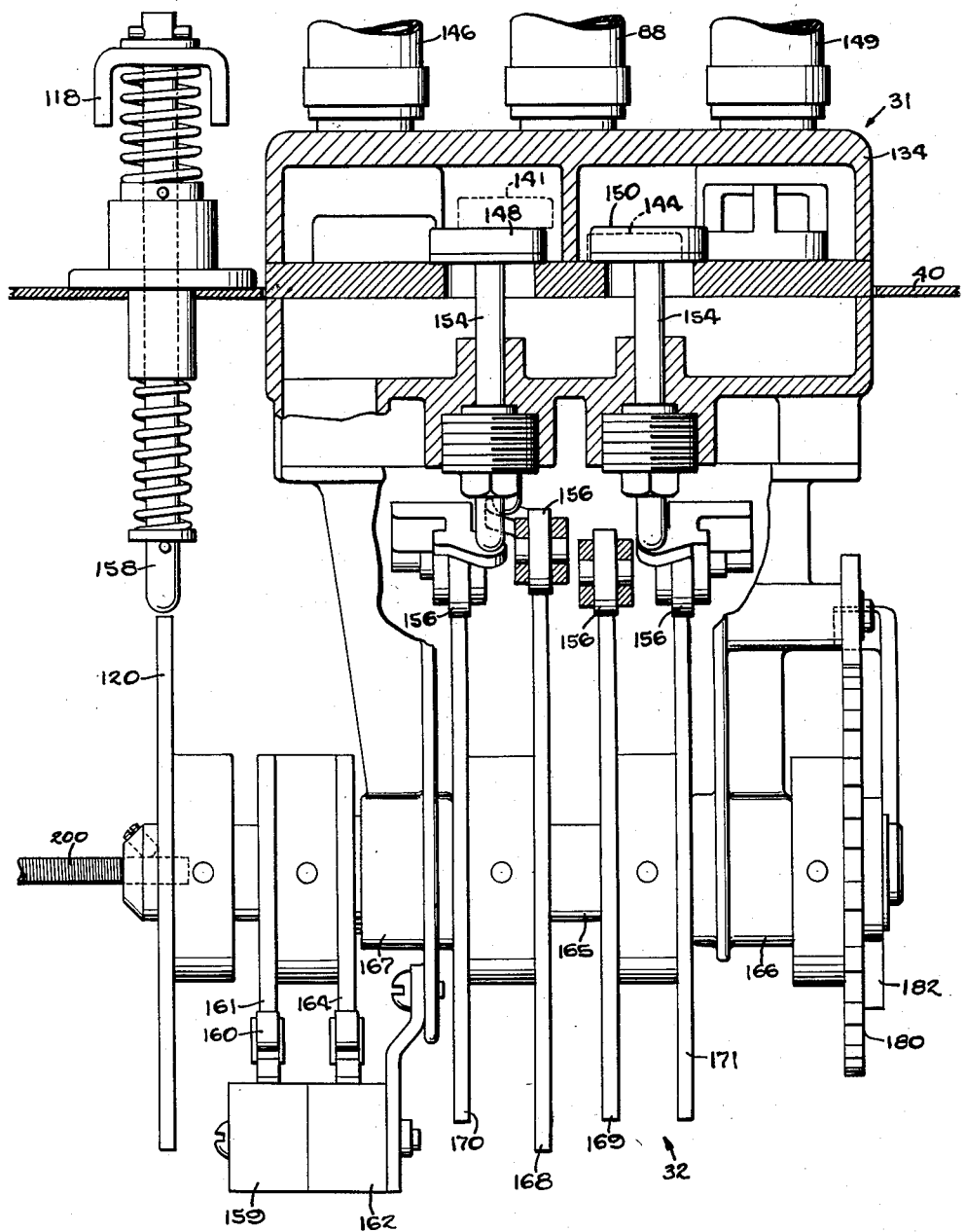

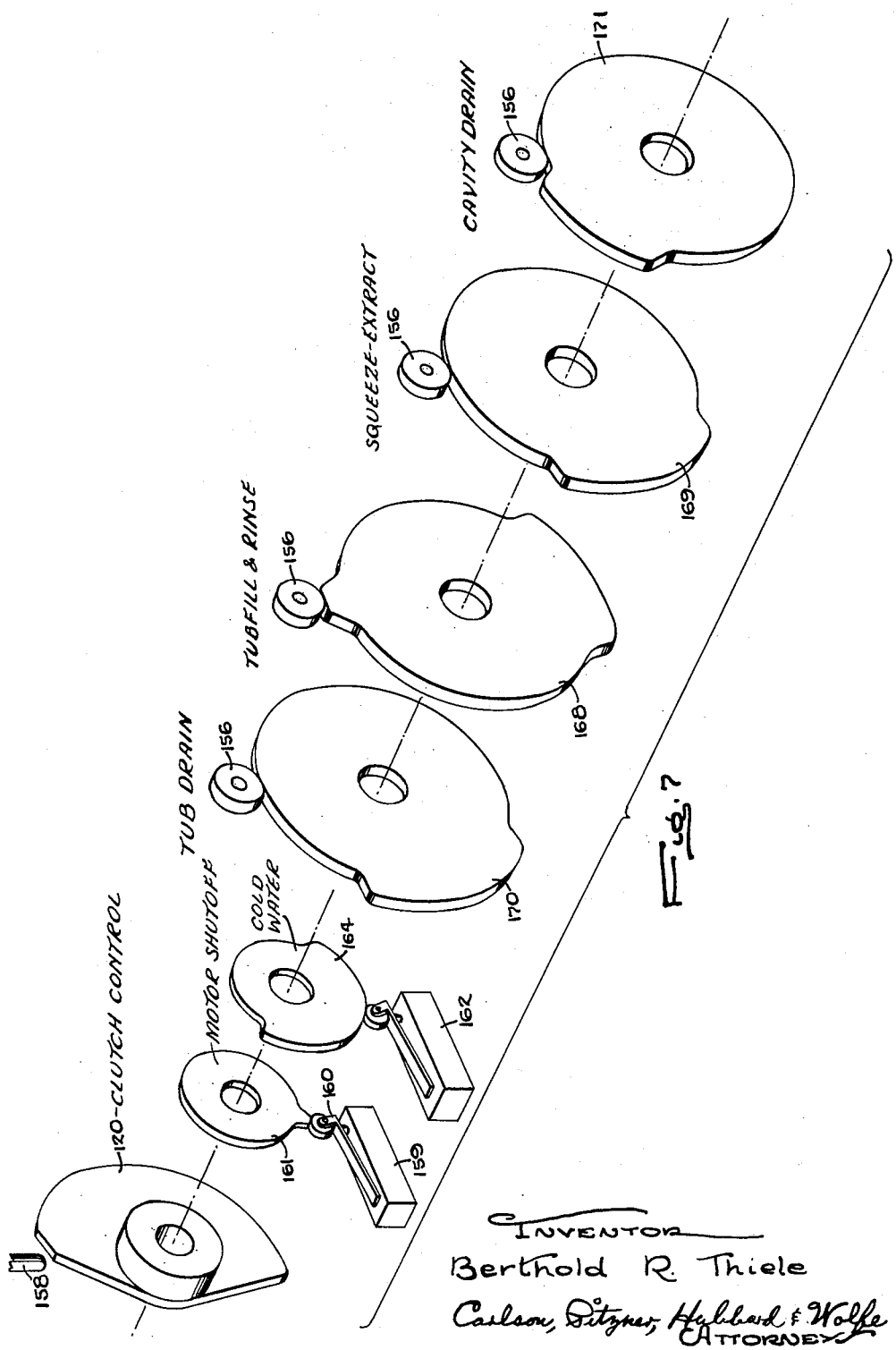

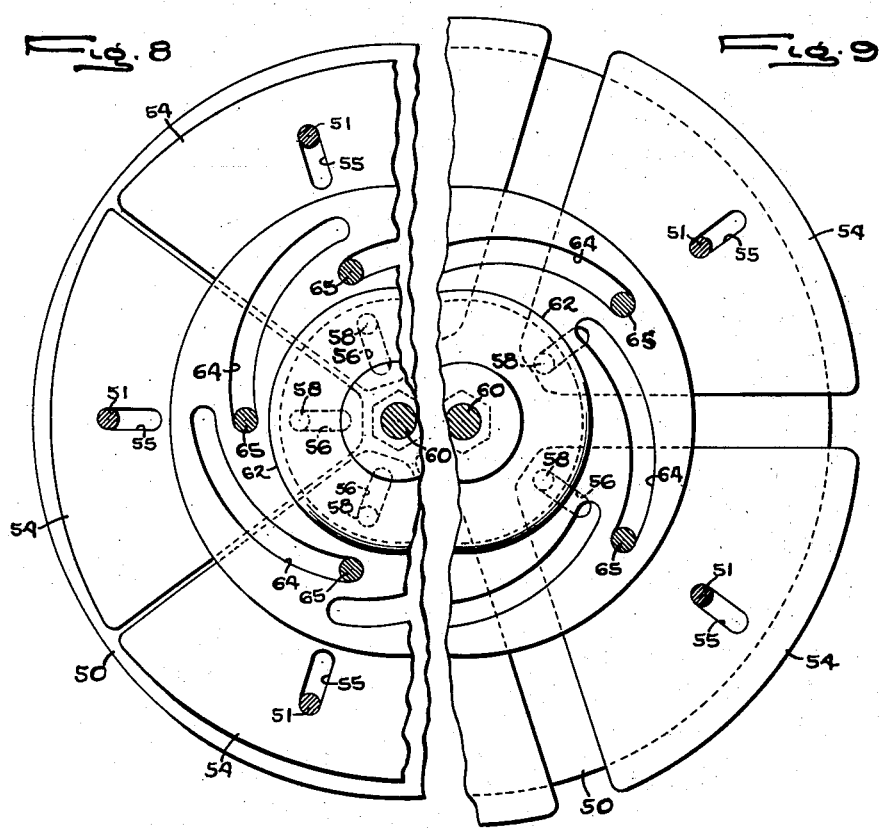
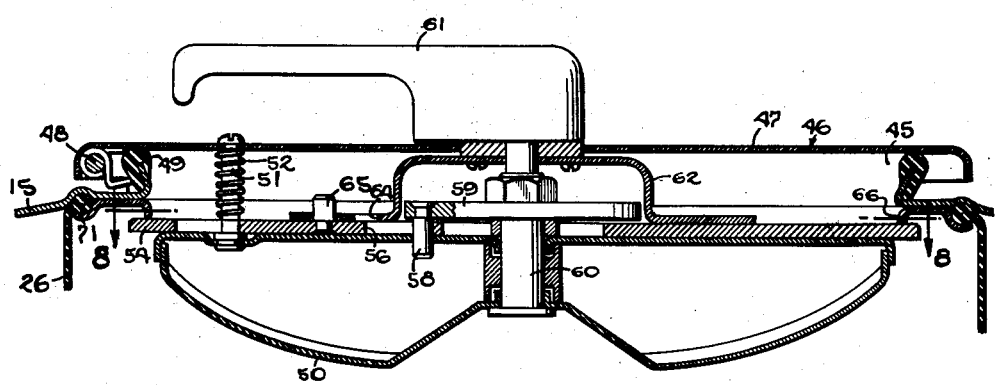

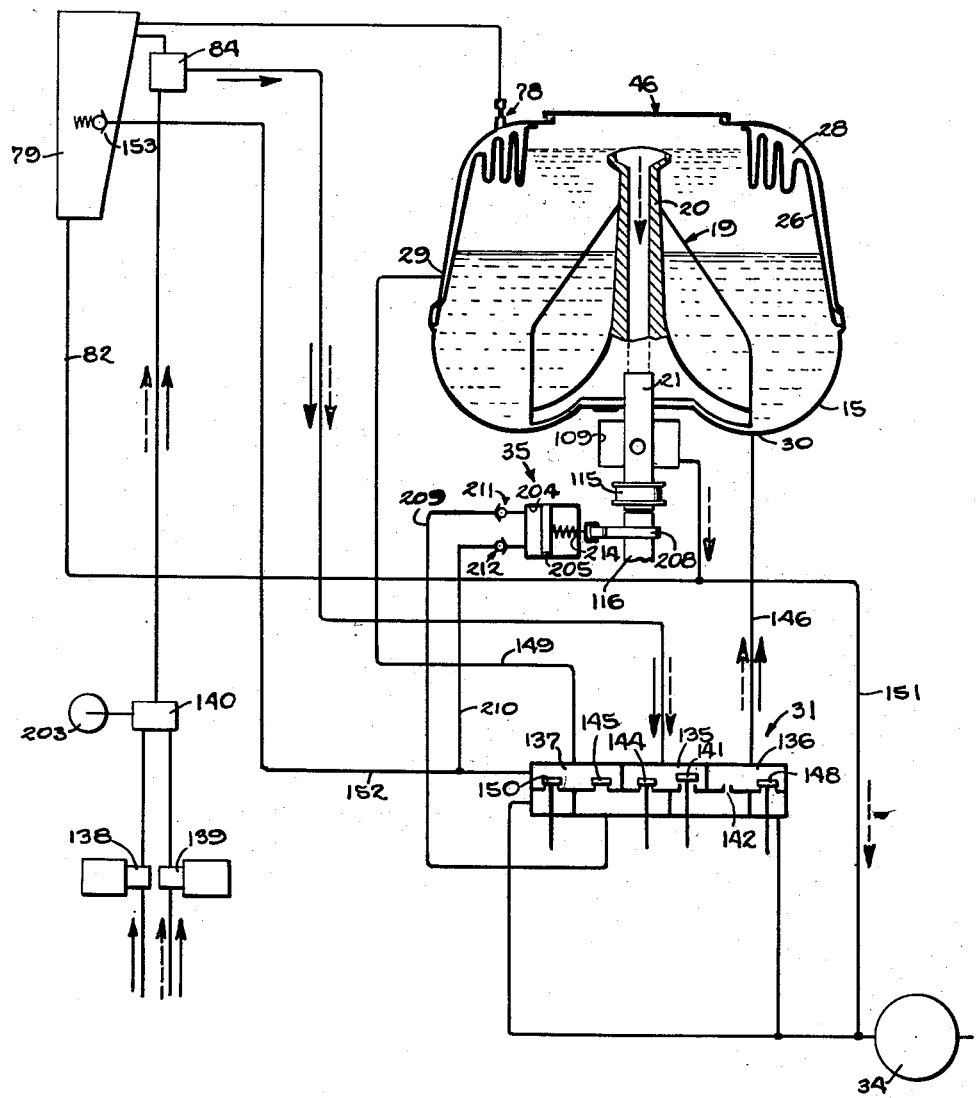

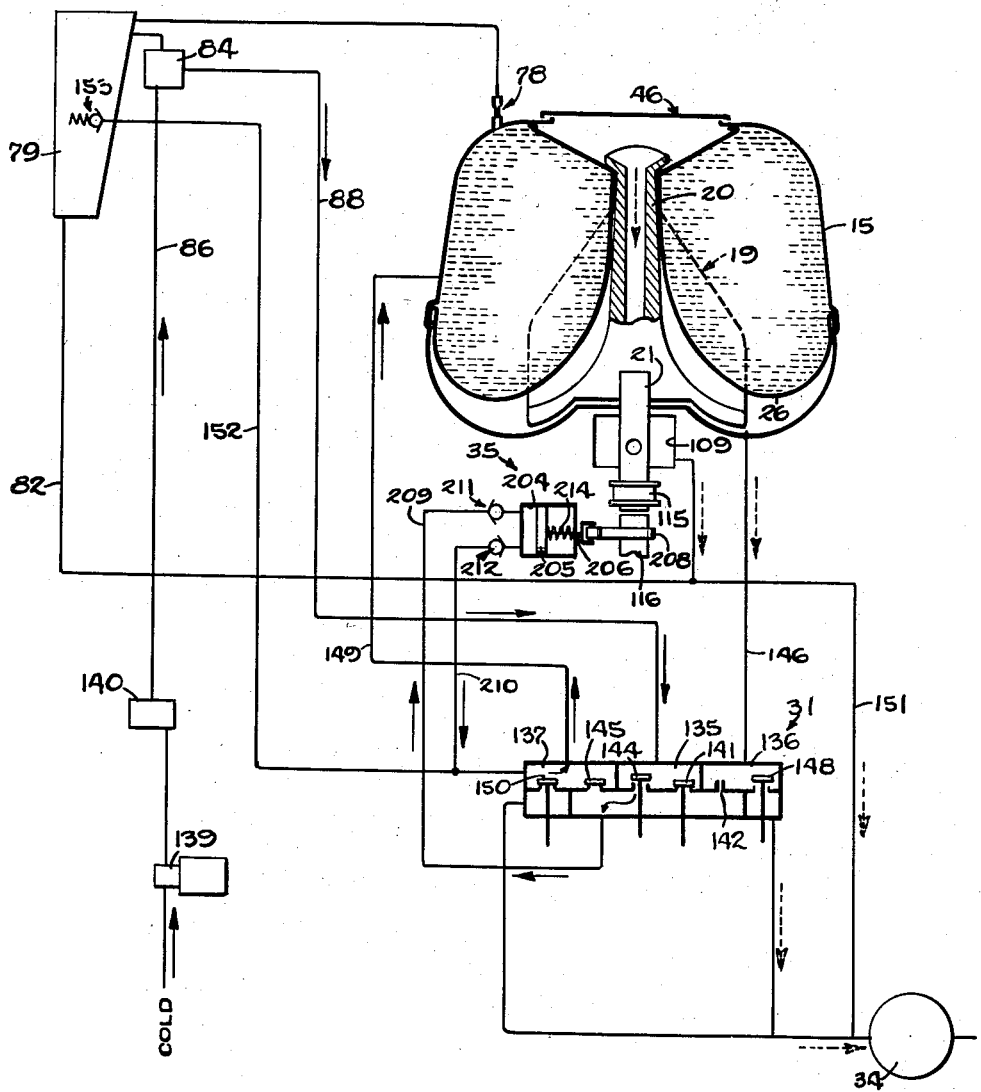

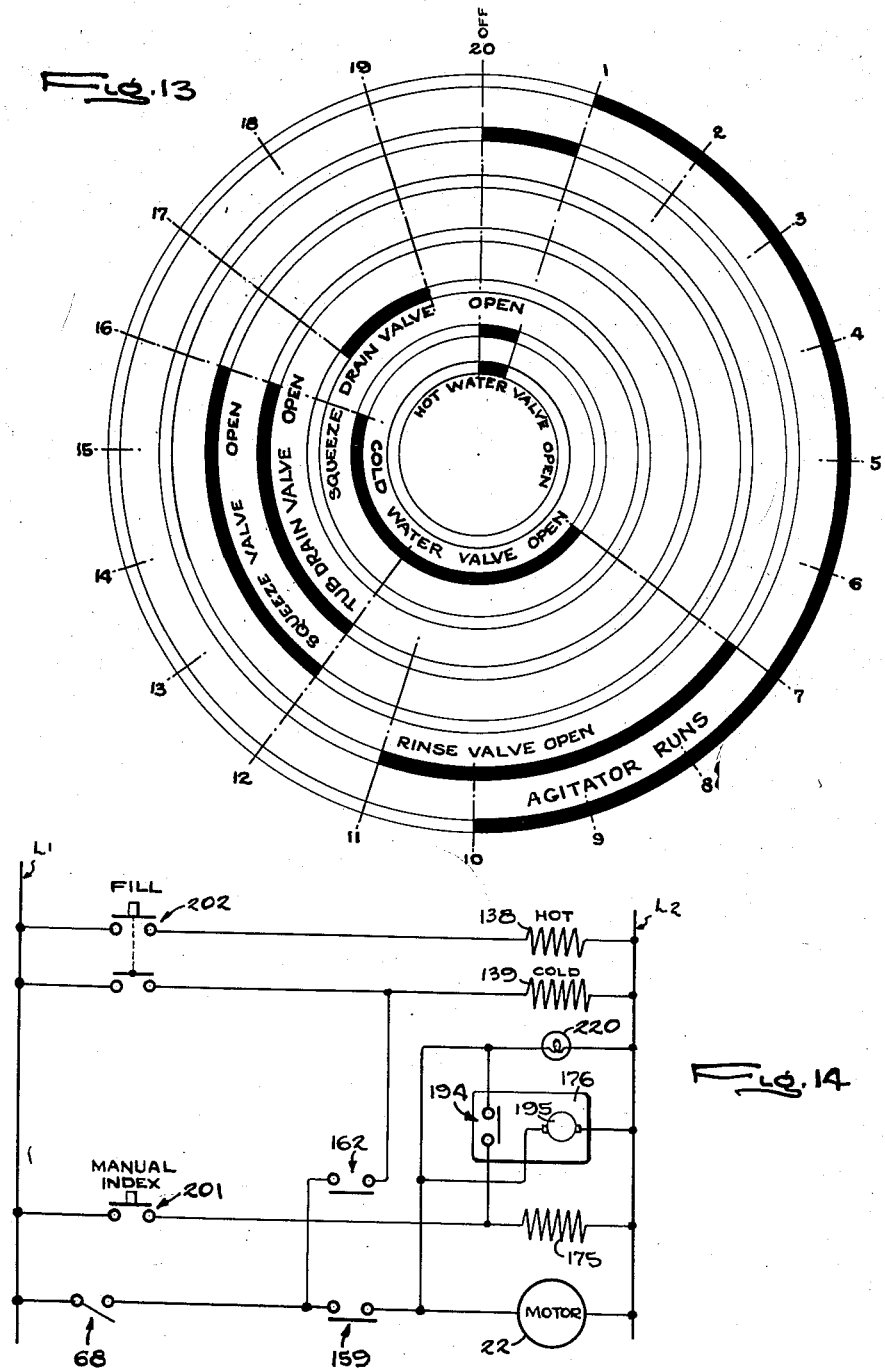

United States Patent Office 2,867,104
Patented Jan. 6, 1959

2,867,104

AUTOMATIC LAUNDRY MACHINE

Berthold R. Thiele, Ripon, Wis., assignor, by mesne assignments, to McGraw-Edison Company, a corporation of Delaware Application January 5, 1954, Serial No. 402,266

7 Claims. (Cl. 68—12)

The present invention relates to automatic laundry machines of the type for performing sequential washing, rinsing, and extracting operations on clothes or other similar items to be washed. The invention relates more particularly to the organization of such machines employing a flexible tub liner adapted to extract water from clothes by squeezing them in response to pressure water.

It is the general aim of the invention to provide a highly efficient automatic laundry machine, particularly suited but not limited to application in home laundries.

In achieving such an aim, it is a further object of the invention to provide in such a machine for controlled variation of the washing cycle time within predetermined limits; for the flushing of scum and the rinsing of clothes without the necessity of completely emptying the tub before proceeding; for a simplified sequence of fill, agitation, and drain operations together with rugged and compact means for effecting such operations in proper sequence and for proper time intervals.

Another object is the provision in such a machine of an improved flexible liner or diaphragm for squeeze-extracting water from washed clothes, together with a tub closure member and agitator which cooperate to prevent damage to either the liner or the clothes under high squeezing pressures.

Other objects and advantages of the invention will become apparent as the following description proceeds, taken in conjunction with the accompanying drawings, in which:

Figure 1 is a perspective view of an automatic home laundry machine embodying the features of the invention, the outer cabinet being omitted for clarity;

Fig. 2 is a vertical section taken substantially along the offset line 2—2 in Fig. 3;

Fig. 3 is a horizontal section taken substantially along the line 3—3 in Fig. 2;

Fig. 4 is a fragmentary detail view, partially in section, of a vacuum breaker mounted on an overflow tank;

Fig. 5 is a detail view of the valve assembly and control means partially in section taken substantially along the line 5—5 in Fig. 3;

Fig. 6 is a detail view of a valve assembly and part of a control system, taken in section substantially along the line 6—6 in Fig. 5;

Fig. 7 is an exploded perspective representation, particularly illustrating the cam bank employed in the control system;

Figs. 8 and 9 are fragmentary detail views taken substantially along the line 8—8 in Fig. 10 and illustrating the tub closure lid in unlocked and locked positions, respectively;

Fig. 10 is a vertical section further showing details of the tub lid;

Fig. 11 is a diagrammatic representation of the plumbing and valve system for filling and draining the machine and for extracting water from clothes washed therein;

Fig. 12 is similar to Fig. 11 particularly illustrating the extracting operation;

Fig. 13 is a circular cycle diagram of the machine's operation; and

Fig. 14 is a schematic line-to-line diagram of the electrical control circuit.

While the invention has been shown and described in some detail with reference to a particular preferred embodiment, there is no intention that it thus be limited to such detail. On the contrary, it is intended here to cover all alterations, modifications and equivalents falling within the spirit and scope of the invention as defined by appended claims.

Referring to the drawings the machine here shown, in keeping with the invention, includes a receptacle or tub 15 (Fig. 1) supported by an underframe 16 which also carries the several drive, pump, valve, and control components. The outer casing or decorative housing for the machine has been omitted for the sake of clarity, except for a small portion thereof which appears at 18 in Fig. 2.

An agitator 19 having a hollow center post 20 is provided on a hollow vertical shaft 21 extending up through the bottom of the tub 15 (Fig. 2). This shaft is given oscillatory rotation by a prime mover, e. g., electric motor 22, working through the eccentric transmission 24 and clutch 25, all carried by the frame 16. The hollow post 20 and shaft 21 additionally serve as an overflow or top drain for the tub to provide enhanced flushing and rinsing operations as explained in the following detailed description.

A flexible liner or sleeve 26 is sealed at its ends around the inner surface of the tub, defining a cavity 28 for receiving water under pressure which expands the sleeve to squeeze clothes and extract water from them. The cavity is provided with an opening 29, and the tub itself is provided with an opening 30, for draining and filling.

Such draining and filling is selectively accomplished by a valve assembly 31 adapted to be connected to a water pressure source and a drain. Each valve of the assembly is actuated in proper sequence and for selected intervals by a control system including a cam bank 32 rotated at a predetermined stepping speed. The agitator clutch 25 and the electric driving motor 22 are also under control of such cam bank.

After the tub 15 has been filled with water, soap, and clothes, and the automatic cycle initiated, the agitator 19 washes the clothes for a predetermined period. Next, water is added to the tub, resulting in a flushing overflow of scum and most of the soapy water down the top drain, i. e., through the hollow post 20 and shaft 21. The agitator continues in motion thereafter for a time until the clothes have been rinsed, whereupon the clutch 25 is automatically disengaged and the bottom drain opening 30 from the tub vented. High pressure water is next supplied to the cavity 28 to expand the sleeve 26 and squeeze-extract the clothes, the extracted water being drained from the tub by a drain pump 34 driven from the motor 22. High pressure for efficient extraction is assured, regardless of water main pressure, by a pressure-fill assembly 35 driven from the transmission 24. Upon completion of extraction, the motor 22 is stopped automatically, and the clothes may be removed.

*Tub construction*

The frame or chassis 16 comprises a flat base plate 40 supported on four legs. The tub 15 is supported by an upright flanged column 41 extending from a housing 42 of the transmission unit 24, which is in turn bolted to the underside of the base plate 40. The tub is formed in a globe-like shape to eliminate "dead" corners as regards water agitation and to prevent sharp creases in the flexible liner 26. The tub in its preferred form comprises two rounded halves formed of stainless steel or other noncorrosive material and fitting together with a welded circular seam defining an annular groove 44.

The tub 16 has a top entrance 45 for loading and unloading items to be washed. A hinge-mounted closure lid 46 (Figs. 2, 8, 9 and 10) seals the entrance when the machine is in operation and provides a smooth bearing surface for the flexible liner 26 when it is expanded. The lid, in this instance, comprises a top plate 47 held by a hinge pin 48 along one side of the entrance 45 and swingable to engage a resilient sealing ring 49 disposed on a vertical flange around the entrance. The plate 47 carries a spaced hollow member 50 which is smaller in diameter than the entrance 45 and which is flat on its top but mushroomed on its bottom and provided with a center dimple. Such hollow member is suspended by a series of five pins 51 between the plate 47 and its top side, each pin having a coaxial compression spring 52. For locking the lid in closed position, a series of five sectors 54 are slidable on the hollow member 50, having radial slots 55 accommodating the pins 51 to permit radial but not circumferential movement. The inner ends of the sectors are also radially slotted at 56 to receive pins 58 extending between a disk 59 and the hollow member 50. The disk 59 and hollow member 50 are mounted for rotation relative to a shaft 60 journaled in and depending from the top plate 47. For lifting the lid as well as for rotating this shaft relative to the top plate 47, hollow member 50 and disk 59, a handle 61 is provided fast on the shaft. A collar 62 rigid with the shaft 60 carries a bolted flange overlying the sectors 54 and having a series of circumferentially spaced spiral cam grooves 64 each receiving a stud or rivet 65 upstanding from one of the sectors.

Upon rotation of the handle 61, shaft 60 and collar 62, the hollow member 50 remains stationary due to the pins 51 connecting it to the top plate 47. Likewise, the disk 59 remains stationary due to the pins 58 connecting it to the hollow member. Thus, the shaft 60 and the collar 62 rotate relative to the member 50 and disk 59, so that the grooves 64 in the collar in acting on the studs 65 cam the sectors 54 radially outward or inward relative to the top plate 47 and hollow member 50. With the sectors 54 retracted (Fig. 8), the lid 46 may be swung closed, after which rotation of the handle 61 pushes the outer ends of the sectors 54 beneath a lip 66 of the tub's entrance to lock the lid closed (Figs. 9 and 10). Uniform pressure is applied to the resilient ring 49, without any parts sliding over it, around its entire circumference to effect a positive liquid seal.

When the lid 46 is closed, it closes a safety switch 68 mounted at the top of the tub (Figs. 2 and 14) on the outer housing 18. Opening the lid 46 and safety switch 68, which is connected in the control circuit to be described, stops the motor 22, precluding injury to an operator and splashing of water. The machine may be stopped at any time during its cycle (as for soaking or the removal of certain articles being washed) simply by raising the lid 46.

The flexible liner 26 is formed in the general shape of a sleeve having beaded marginal edges 70, 71. It may be fabricated from rubber, plastic, or similar materials. The lower edge 70 is sealed to the inner wall of the tub 15 by location with a retaining ring 72 in the annular groove 44 defined just above the welded seam and generally below the vertical center of the tub. The liner 26 is shaped to extend with corrugated expansion folds 74 to just beneath the top entrance where the upper marginal edge 71 is clamped in sealing relation between jaws provided in the tub. The liner 26 thus provides the fluid-tight cavity 28, annular in shape, between itself and the tub's inner wall. It is further provided with a plurality of protuberances or buttons 75 molded or formed integrally on its outer surface to prevent sticking to the tub and to assure that when pressured water is supplied to the cavity the sleeve will expand to squeeze clothes disposed in the tub.

The bleeder valve 78, preferably of the ball type, is provided for bleeding any air from the cavity 28 when pressured water is admitted to expand the liner 26. This valve is located near the top of the tub 15 (Fig. 2) and has a very small opening, for example, one sixteenth of an inch, so that loss of water through it during the squeeze-extraction operation is negligible.

The bleeder valve 78 is connected to discharge air or water into an overflow tank 79 situated in an upright panel 80 at one side of the tub 15. A program indicator dial 81, as well as control push-buttons and knobs, are located in plain view of the top of this panel as explained more fully below. The overflow tank 79 within the panel 80 is adapted for connection to a drain through a conduit or hose 82 and additionally carries, at a point considerably above the highest water level in the tub, a protective vacuum breaker 84. The vacuum breaker prevents the drawing of water from the tub 15 into water mains upon the development of a vacuum in the latter; and yet it permits water main pressure to be utilized in back of the liner 26 for squeezing and extracting clothes. The breaker 84 (Fig. 4) comprises, in this instance, a hollow housing 85 having an inlet conduit 86 to which water mains may be coupled (see Fig. 11), and an outlet conduit 88 connected to supply water to the tub 15 and liner 26 through the control valve assembly 31. The housing includes a pair of spaced apertured walls 89, 90 between which is disposed a valve disc 91 movable upwardly to seal the upper aperture, which communicates with the atmosphere through a fitting 92, under the influence of water pressure. When there is pressure in the water mains, therefore, the upper aperture is sealed and no water can escape from it, water supplied through the inlet conduit 86 flowing through the outlet conduit 88. Should a vacuum develop in the water mains, however, the valve disc 91 is withdrawn from the top aperture and rests against a series of projections 94 around the lower aperture, venting the inlet conduit 86 to the atmosphere so that water is not sucked back from the outlet conduit 88 into the water mains.

*Agitator and drive*

The hollow shaft 21 extends upwardly through the bottom of the tub 15 and has a radial flange 100 journaled in a thrust seat 101 of the hollow column 41 to which the tub is bolted in sealed relation for support. The upper end of the shaft 21 is splined to receive a splined insert 102 fastened into the one-piece agitator 19. Two vertically tapered vanes 104 extend radially from the hollow center post 20. A rubber sealing washer 105 is interposed between the agitator and the top end of the hollow shaft, the upper end of the agitator's central post 20 extending to the highest level for water in the tub 15 and being capped with a slotted grill or screen 106 which fits into the dimple of the hollow member 50 when the lid 46 is closed.

The top drain passage is established from the tub 15 through the post 20 and shaft 21, and radial holes 108 in the lower end of the shaft 21 leading into a sump 109 defined in the column 41. The shaft 21 is sealed by resilient rings 110, 111 above and below the sump. The sump is connected by a fitting 112 to a drain, in this instance through the drain pump 34.

Immediately below the sump 109, the shaft is provided with clutch splines 114 and an axially movable internally splined clutch sleeve 115 for selectively connecting it to be driven from a splined output shaft 116 of the transmission unit 24. A lever 118 (Fig. 3) having a shifter fork 119 disposed between flanges on the sleeve 115 is pivoted to the base plate 40 and rocked under the control of a clutch cam 120 (Fig. 7) to actuate the clutch 25 according to a predetermined cycle explained in detail below.

The transmission unit 24 is powered by the motor 22 which is suspended from the base plate 40 with its shaft extending vertically through an opening to carry a pair of drive pulleys 121, 122 (Figs. 2 and 3). A first of these pulleys is connected by a belt 124 to a large speed reduction pulley 125 on an input shaft 126 of the transmission unit 24. The input shaft 126 carries a wheel 128 to which a connecting arm 129 is eccentrically journaled. The arm 129 is journaled at its other end to a rocker arm 130 pivoted on a stud 131 in the unit's housing and drivingly linked to the output shaft 116. The motor 22 thus serves to drive the agitator 19, through the transmission 24, clutch 25 and hollow shaft 21, in oscillatory rotation at a reduced speed of about seventy oscillations per minute.

The second motor drive pulley 122 is connected by a second belt 132 to an upright shaft of the drain pump 34, which is also suspended beneath the base plate 40. The pump 34 is thus driven whenever the motor is running. Any suitable form of rotary pump may be employed.

Valve assembly and connections

The valve assembly 31 (Figs. 3, 5, 6, 11 and 12) comprises a single housing 134 mounted in partially sunk relation on the base plate 40. The housing is divided into three major compartments, an inlet compartment 135, a tub fill and drain compartment 136, and a liner fill and drain compartment 137 (see diagrammatic showing in Fig. 11). A series of movable valve members control the flow of washing fluid, i. e., water, from one compartment to another and effect the desired draining and filling operations. The inlet compartment 135 is connected to sources of hot and cold washing fluid, i. e., to water mains, through hot and cold solenoid valves 138, 139 (Fig. 11), a temperature selecting device 140, and the vacuum breaker 84. The compartment 135 has a pair of valves mounted on externally extending stems to be actuated by cams for selectively directing inlet water to either the tub or liner compartments 136 and 137. In the first instance, a "fill and rinse" valve 141 supplies water through a restricted port 142 to the tub compartment 136. In the second instance, a "squeeze-extract" valve 144 supplies water through a spring-biased check valve 145 to the liner compartment 137.

The tub compartment 136 is connected by a conduit or hose 146 to the opening 30 in the bottom of the tub 15, and through a "tub drain" valve 148 to the inlet of the drain pump 34. The liner compartment 137 is connected by a hose or conduit 149 to the opening 29 communicating with the cavity 28 between the liner and tub wall. A "cavity drain" valve 150 serves to connect the liner cavity 28 with the inlet of the drain pump 34.

It will also be clear from Figs. 11 and 12 that the overflow tank 79 and column sump 109 are connected by suitable conduits 82 and 151 directly to the inlet of the drain pump, which has its outlet leading to a drain pipe or drain container (not shown).

The pressure fill assembly 35 or pressure booster for water supply to the cavity 28 is also connected to the liner compartment 137 and a safety relief line 152 and valve 153 lead to the overflow tank 79 as more fully described below.

Control system

The laundry machine is intended to be filled first with proportioned hot and cold water by an operator who shuts off the water and adds soap when the desired level for the washing water is reached. Automatic termination of the filling operation, responsive to water level in the tub 15, may be provided in any of several well known ways, if desired. Once the tub 15 has been filled, the control system completes the cycle automatically.

For this purpose, the several valves 141, 144, 148 and 150 of the valve assembly are each carried by valve stems 154 slidably sealed through and extending vertically downward from the valve housing 134 (Figs. 5 and 6). Each rests on a cam follower arm 155 pivoted to the underside of the housing 134 and adapted to be rocked vertically by a cam follower wheel 156 riding on a corresponding rotary cam. The clutch lever 118 is also rocked to engage or disengage the clutch 25 by a vertically slidable follower pin 158 extending beneath the base plate 40 to ride on the rotary clutch cam 120. Additionally, the motor 22 is connected in circuit with a limit switch 159 having an actuator cam 160 following a "shut-off" cam 161, while the cold water solenoid valve is controlled by a second limit switch 162 actuated by a "cold water" cam 164.

All of the above-mentioned cams are mounted in a bank, spaced along and properly phased on a single shaft 165 journaled in brackets 166, 167 depending from the housing 134. The cam bank makes one revolution for each complete laundry cycle. The cam bank is, for the most part, disposed beneath the valve assembly (Fig. 6).

Referring especially to Fig. 7, a tub "fill and rinse" cam 168 is shaped to lift and open the "fill and rinse" valve 141 at the beginning of the cycle (the position of the cams shown in Fig. 7 relative to their followers) and later for a certain interval along about the middle of the cycle. Cavity "squeeze-extract" and "tub drain" cams 169, 170 are shaped and phased to open their valves 144 and 148, respectively, for an interval near the end of the cycle, while a "cavity drain" cam 171 has a rise to open the cavity drain valve 150 for a period just before the end of the cycle. The clutch cam 120 is shaped to lift its follower pin 158 and engage the clutch 125 shortly after the cycle starts, and then to disengage the clutch along about the middle of the cycle. The motor "shut off" cam 161 is shaped to depress the switch actuator arm 160 only at the end, and at the beginning of the cycle, that is, to open the switch 159 and de-energize the motor 22 when the cycle is complete. The "cold water" cam 164 opens its switch 162 during approximately the first and last quarters of the cycle, closing the switch to open the cold water solenoid valve 139 during the remaining mid-portion of the cycle.

For rotating the cam bank at a slow and uniform speed to accurately time each part of the cycle, there is provided a stepping ratchet mechanism pushed by a solenoid 175 which is energized at regular intervals by an electric timer 176.

The ratchet mechanism (Fig. 5) includes a ratchet wheel 180 having a plurality of teeth 181 and mounted fast on one end of the cam bank shaft 165. An indexing arm 182 is pivoted at its one end to the shaft 165 and connected at its other end to the armature 184 of the solenoid 175. Gravity biases the armature 184 to its lower position (Fig. 5), but when the solenoid 175 is energized, it lifts the armature 184 and swings the indexing arm 182 counterclockwise (as viewed in Fig. 5) a limited amount. The indexing arm 182 carries a pivoted main pawl 185 biased by a spring 186 toward engagement with the teeth 181 of the wheel 180. The pawl 185 has an inclined surface 188 at its lower edge causing it to pivot against the force of its spring 186 when the index arm 182 drops clockwise. The pawl 185 thus rides free of the teeth 181. However, upon an upward stroke of the armature 184 and counterclockwise movement of the indexing arm 182, the opposite straight edge 189 of the pawl engages the ratchet teeth 181 and pushes the ratchet wheel 180 counterclockwise.

In order to retain the ratchet wheel 180 in a given position, particularly against the drag caused by the sliding of the main pawl 185 when the armature 184 drops, a holding pawl 190 is pivotally mounted on the valve assembly housing. This holding pawl 190 retains the ratchet wheel 180 and cam shaft 165 in a given position but is lifted clear of engagement with the ratchet 180 when the indexing arm 182 swings counterclockwise by a pawl-release lever 191 which slides therealong and abuts a shoulder 192. More fully, when the indexing arm 182 drops, the release lever 191 first retreats from the shoulder 192, letting the holding pawl 190 rock downwardly under the urging of gravity to lock with the ratchet teeth 181. The main pawl edge 189 next retreats from the engaged ratchet tooth and snaps into the succeeding space. But upon upward swing of the indexing arm 182 the release lever 191 first abuts the shoulder 192 on the holding pawl 190, swinging it clear of the ratchet teeth 181, after which the main pawl edge 189 contacts the adjacent tooth 181 and pushes the ratchet wheel 180 and cam shaft 165 one step forward in a counterclockwise direction.

The solenoid 175 is connected in circuit with the contacts 194 of any well known electric timer 176 indicated schematically in Fig. 14. These contacts are closed at regular intervals, say every 1.5 minutes, by the timer to pulse the solenoid 175 and move the ratchet wheel 180 one step during each time interval. The timer motor 195 itself is connected in parallel with the motor 22 so that whenever the drive motor 22 is running the control assembly is operative to bring about and time the various operations.

A flexible cable or shaft 200 connects the cam shaft 165 to the indicator dial 81 on top of the upright panel 80, the dial thus rotating with the cam shaft and showing the exact point in the cycle at which the machine may be operating at any time. A cycle-starting and manual indexing push-button 201 (see Fig. 14) may also be located for convenient access to this panel. A switch 202 (Fig. 14) for energizing the hot and cold water solenoids for the initial filling of the tub, and a setting knob 203 (Fig. 11) for the proportioning device 140, in like manner may be on the upright panel 80.

Pressure fill system

In order to positively assure that water under relatively high pressure is available to be supplied to the cavity between the flexible liner and the tub's inner wall, when the water main pressure is low, there is provided an auxiliary pressure fill system which is operative to boost the pressure of water supplied to the cavity to such value that clothes, or other items which have been washed and rinsed, are tightly squeezed by the liner and the water thoroughly extracted from them. Such a pressure fill system, as here shown, may be of the type more fully described and claimed in applicant's copending application Serial No. 211,504, filed February 17, 1951, now Patent No. 2,766,601. This auxiliary pressure fill system is not only adapted to be driven or energized by the machine's drive motor 22 but, additionally, is brought into operation only when the pressure available from the water mains is insufficient for adequate extraction.

In brief, the pressure fill system 35 comprises a piston-type pump having a housing 204 mounted on the top of the base plate 40 and a piston 205 axially slidable therein. A piston rod 206 extends for engagement with an eccentric cam 208 on the upper end of the transmission output shaft 116 (Fig. 2). The cylinder 204 is connected by two lines or conduits 209, 210, having inlet and outlet check valves 211, 212, respectively, to the inlet and outlet sides of the check valve 145 in the valve assembly 31 (see Fig. 11). The piston 205 is biased outwardly so that its rod 206 is normally free from engagement with the cam 208. Such biasing may be provided by a coaxial compression spring 214. The pressure of water passed through the inlet check valve 211 is sufficient to retract the piston against the force of the spring 214 when a boost in pressure is necessary, to thereupon cause the cam 208 to drive the piston forwardly and push the water through the outlet check valve 212 and thence into the cavity 28 formed by the liner 26. The pressure relief valve 153, located within the overflow tank 79 connected by the line 86 to the outlet conduit 210 of the booster pump prevents the excessive pressures to be formed by the pump. In such event, the relief valve 153 vents the system to the overflow tank 79 and the water so vented is directed to the drain.

In operation, the eccentric cam 208 is driven continuously by the transmission output shaft 116 as long as the drive motor 22 is energized and regardless of whether or not the agitator 19 is clutched for oscillatory action. However, the booster pump is normally inoperative because the biasing spring 214 holds the piston rod 206 free from engagement with the eccentric cam 208. When water is supplied through the "cavity fill" valve 144 it passes freely through the check valve 145 in the valve assembly until the pressure exerted on the flexible liner 26 is equal to the pressure available from the water mains. During this time there is no feed to the pump through its inlet check valve 211. However, when the water main pressure and cavity pressures become equal and the assembly check valve 145 closes, inlet water is then supplied through the pump's inlet check valve 211, forcing the piston 205 through an intake stroke and engaging the piston rod 206 with the eccentric cam 208. The cam on its next revolution pushes the piston 205 in an exhaust stroke to pump the water through the outlet check valve 212 with increased pressure and through the liner compartment 137 to the liner cavity 28. This action continues until the liner 26 exerts a predetermined high pressure against clothes to squeeze and extract water from them, the relief valve 153 then venting the system. A predetermined, relatively high pressure such as eighty pounds per square inch may be thus obtained and maintained in the cavity 28. If the water main pressure is as high as seventy-five or eighty pounds per square inch, the booster or pressure fill system will not come into operation, its additional boost in pressure being unnecessary. Moreover, whenever a boost in pressure is necessary it is not put into effect until full utilization of the water main pressure is first had. And yet, the entire operation of the system is automatic as regards initiation, no manual or special controlling devices being required.

Control circuit

Turning now to Fig. 14, the electric control circuit for the present machine is simple in nature yet effective in producing an automatic, although flexible, cycle of operation with inherent safety features. The hot and cold water solenoids 138, 139 for the hot and cold water supply valves are connected across a voltage source represented by the lines $L_1$ and $L_2$, each solenoid being in series with a manually depressed push-button switch 202, having ganged contacts for simultaneous operation. This switch is depressed by an operator to effect the initial filling of the machine. During such filling the control knob 203 (Fig. 11) or other element for the proportioning device 140 may be set to provide any desired temperature for the washing water between the extremes of hot and cold.

The electric drive motor 22 is connected across the lines through the safety switch 68 and the cammed shut-off switch 159, the timer motor 195 being connected in parallel with the motor 22 and energized when the latter is running. The indexing solenoid 175 is also connected in parallel with the motor 22 but through the timer contacts 194. Closing of these contacts at periodic intervals thus pulses the solenoid 175 when the switches 68 and 159 are closed as the machine is going through its cycle. The cold water solenoid 139 may also be energized through the safety switch 68 and the cold water limit switch 162 actuated by the cam bank. The manual indexing push-button 201 is provided directly in series with the index solenoid 175 between the two lines $L_1$ and $L_2$ such push-button being normally open and depressed to start the cycle or to advance the cam bank at any time while the cycle is in progress. A pilot light 220 may be connected in parallel with the drive motor 22 to indicate when the machine is in the process of completing its cycle. When the pilot light goes out, i. e., when the motor 22 is finally de-energized, the cycle is complete and an operator may then remove the washed and extracted clothes.

*Operation*

Prior to the start of a laundry cycle, the cam bank is initially in the angular position shown in Fig. 7 with respect to its cam followers. That is, the tub "fill and rinse" valve 141 is open while all remaining valves 144, 148 and 150 are closed. The motor 22 is de-energized and the cold water limit switch 162 is open. The clutch cam 120 leaves the clutch 25 in disengaged position under the urging of the biasing spring on its follower pin 158.

As the first step clothes to be washed are placed in the tub 15, and it is filled, under manual control, by depressing the ganged push-button switch 202 in series with the hot and cold water valve solenoids 138, 139. (See the solid arrows in Fig. 11 for an indication of water flow during the filling period.) The hot and cold water proportioning device 140 may at this time be set to provide wash water of a desired temperature and soap or detergent powders added as desired. When the tub 15 has been filled, the "fill" push button 202 is released. The lid 46 is closed and is sealed by turning the handle 61 to advance the sectors 54 radially beneath the upper lip 66 on the tub 15.

The automatic cycle of operation is started by momentarily closing the start and manual index switch 201. This energizes the indexing solenoid 175 and advances the cam bank one step, whereupon the motor shut-off switch 159 is closed by its cam 161 to start the drive motor 22. The motor 22 thus immediately begins to drive the drain pump 34 and since the timer motor 195 is connected in parallel, it too, is simultaneously energized. In addition, when the cam bank is advanced the first step, the clutch cam 120 pushes its following pin 158 upwardly to engage the clutch 25 and start the agitator 19 in driven oscillatory motion from the motor 22 through the transmission 24. Referring to the circular cycle diagram in Fig. 13, the filling period is represented by the sector between the numbers representing steps 20 and step 1. Upon completion of the first step, caused by depressing the start switch, the condition obtains as illustrated between the numbers 1 to 7 on the circle of the cycle diagram. During this time, the agitator 19 is oscillating to wash the clothes in the warm soapy water provided.

After a predetermined wash period during which the cam bank is advanced seven steps by the ratchet mechanism at intervals of, say, 1.5 minutes requiring a total of 10½ minutes, the cold water switch 162 is closed by its cam 164 to open the cold water solenoid valve 139, while at the same time the "fill and rinse" valve 141 leading to the bottom of the tub is also opened. Under these conditions cold water is supplied from the water main through the vacuum breaker 84 and valve housing 134 to the bottom of the tub 15, while the agitator 19 continues to oscillate. The additional water supplied to the tub flushes the scum and soapy water down through the top drain and passageways provided by the hollow agitator post 20 and agitator shaft 21. This overflow water is drawn through the column sump 109 and drain pump 34 to the drain. (See the dashed arrows in Fig. 11 indicating the paths of water flow during this period.) This flushing and addition of rinse water continues during the steps 7 through 11 of the cam bank thus requiring, for example, a total of six minutes. It is to be noted that it is unnecessary to completely empty the tub 15 between the wash and rinse operations, a step which would require a considerable period of time. It is sufficient that the rinse water added at the bottom of the tub push the soapy water out through the top drain passage provided by the hollow agitator shaft 21. Upon the completion of the 10th step, the clutch cam 120 lets its follower pin 158 fall to disengage the clutch 25, whereupon the agitator's motion is stopped. Upon the completion of the 11th step, that is, after say 1.5 minutes from the time agitator is stopped, the "fill and rinse" valve 141 is closed, thus stopping the supply of additional cold water to the tub notwithstanding the fact that the cold water solenoid valve 139 remains energized.

During the 1½ minutes required for the cam bank to make its 12th step the clothes are soaked in the rinse water and at the end of this time the cams act to open the "tub drain" valve 148 and the "cavity fill" valve 144. The first serves to drain water from the tub through its bottom opening 30 to the drain pump 34, while the second supplies water from the already open cold water solenoid valve 139 through the valve body 134 to the cavity 28 between the liner 26 and the tub's wall. (See the flow arrows in Fig. 12 illustrating the squeeze-extract operation.) This serves to expand the liner 26 into firm contact with the rinsed clothes to squeeze and extract water from them. The extracted water then runs out the bottom opening 30 to the drain pump 34. During this interval, i. e., steps 12 to 16 as shown in Fig. 13, the booster system 35 comes into operation automatically, if necessary, to augment the pressure available from the water mains. It takes water directly from the "cavity fill" valve 144 and pushes it under booster pressure to the liner compartment 137, from whence it goes to the liner cavity 28. The booster pump positively assures that a relatively high pressure, such as eighty pounds per square inch, is supplied back of the flexible liner 26 to squeeze the clothes and thoroughly extract any rinse water remaining in them.

It is further to be noted that during this squeezing operation the clothes cannot be torn or ripped by the agitator 19, since only two vanes 104 are provided and no tensioning of the clothes around the vanes results. Secondly, the globe-like shape of the tub 15 and the mushroom-shaped hollow member 50 on the lid provide smooth surfaces against which the liner 26 may bear without itself being creased or torn.

At the end of the extraction period the cams close the "tub drain" valve 148 and the "cavity fill" valve 144. They also open the cold water limit switch 162 to thereby close the cold water solenoid valve 139. The clothes then remain squeezed for the 17th step, after which the "cavity drain" valve 150 opens under the influence of its cam 171 for the three minutes elapsing during the 18th and 19th steps. Upon the 20th step, the motor shut-off switch 159 opens to deenergize the motor 22. The "fill and rinse" valve 141 is also opened, reconditioning the control system for another cycle. Since the cold water valve 139 is closed at this time, such opening of the tub "fill and rinse" valve has no effect in supplying additional water to the tub. The cycle is at this time complete with the clothes having been washed, flushed and rinsed, and extracted. The cam bank is in its original starting position ready to begin another cycle. The clothes may thus be removed by opening the lid 34 and a new load put through the laundry operation as described above.

At any time during the cycle it is possible to shorten the interval for any operation simply by depressing the manual index push-button 201 one or more times. Each time this switch is closed the cam bank is rotated one step by direct energization of the indexing solenoid 175, i. e., by-passing the timer contacts 194. This serves to shorten the cycle by the time required for the one step, e. g., 1.5 minutes. Additionally, the operation of the machine could be halted at any point during the cycle simply by opening the lid 46 which would serve to deenergize all of the electrical components. The several valves 141, 144, 148 and 150 would remain in the positions occupied at the time the safety switch is opened, thus retaining water already in the tub if the washing or rinsing operations are in progress. However, the cold water valve 139 will be closed as long as the safety switch 68 is opened, thus stopping the addition of rinse water if rinsing were in progress when the lid is opened. But even if water continues to be added, no spilling could occur because the excess water would merely be discharged to the drain through the hollow agitator post 20 and shaft 21. Once interrupted by opening the lid, the cycle may again be restarted from the point of its interruption by closing the door, thus closing the safety switch 68 to re-energize the drive motor 22 and timer motor 195 since the switch 159 will be closed except at the very end of a cycle.

I claim as my invention:

1. In an automatic laundry machine, the combination comprising a stationary washing receptacle, a hollow shaft extending into the receptacle, a two-vane agitator mounted on said shaft, motive and transmission means for imparting oscillatory rotation to said shaft, a flexible liner sealed to overlie a portion of the receptacle's inner surface, a first fill-and-drain conduit leading from said receptacle, a second fill-and-drain conduit leading from the cavity between said liner and said inner surface, a third drain conduit leading from the lower end of said hollow shaft, valve means for selectively connecting said first and second conduits to a pressure source of washing fluid or to a drain, and automatic program means initiated into operation after said receptacle has been filled with washing fluid for controlling said valve and motive means to start said motive means, for admitting additional fluid to flush and rinse the original fluid through said hollow shaft, for draining the remaining fluid through said first conduit, for disconnecting said transmission means, for admitting fluid through said second conduit to expand said liner and squeeze clothes in the receptacle, for draining said last-named fluid through said second conduit, and for stopping said motive means.

2. In an automatic laundry machine, the combination of a stationary globe-shaped tub having a closable top loading entrance, a hollow shaft extending upwardly into said tub and sealed for rotation relative to it, said shaft having an opening at its lower end adapted for connection to a drain, a two-vane agitator fastened to said shaft, a motor and transmission means for imparting oscillatory rotation to said shaft, a flexible liner sealed at its edges to the upper portion of the tub's inner surface, a first fluid inlet and outlet opening defined in the bottom portion of the tub wall, a second opening defined in the upper portion of the tub wall for admitting and removing fluid to and from the space between said liner and said inner surface, a valve body having a plurality of valves and adapted to be connected to a source of pressure fluid and a drain, said valves being connected to selectively supply or drain fluid through said first and second openings, a cam bank for operating said valves in predetermined timed sequence, means for rotating said cam bank after the tub is filled with fluid to effect addition of more fluid to cause flushing and rinsing by displacement of fluid through said hollow shaft, and thereafter connecting said first opening to said drain and supplying and draining fluid through said second opening to expand and contract said flexible liner.

3. In an automatic laundry machine for performing timed sequential operations on clothes or the like, the combination comprising a globe-shaped tub having a closable top entrance, a hollow shaft extending in rotatable sealed relation upwardly through said tub, said shaft having an opening at its lower end adapted for connection to a drain, a two-vane agitator on said shaft, a motor and transmission for rotatably oscillating said shaft, a flexible sleeve sealed at its respective edges to the inner surface of said tub, a first opening in the bottom portion of the tub wall, a second opening in the side portion of the tub wall communicating with the space between said sleeve and inner wall, means for filling said tub with water through said first opening, a cam bank, timed means for rotating said cam bank, first valve means actuated by said cam bank for supplying additional water through said first opening to thereupon flush or drain the original water through said hollow shaft, clutch means next actuated by said cam bank for disengaging said transmission, said cam bank then being operative to open said first valve means to drain said tub through said first opening, second valve means next actuated by said cam bank to supply water through said second opening, a booster pump driven by said motor to increase the pressure at which such water is supplied, said second valve means then being actuated by said cam bank to drain such water through said second opening, and switch means next actuated by said cam bank to stop said motor.

4. In an automatic laundry machine, the combination comprising a washing receptacle, a hollow shaft extending up through the bottom of said receptacle and journaled for rotation, said shaft having an opening at its lower end adapted for connection to a drain, means for imparting oscillatory rotation to said shaft, an agitator having a hollow central post fixed over and in communication with said shaft to thereby define a drain passage from the top of said receptacle through said post and shaft to the drain, an opening in the bottom portion of the receptacle wall, valve means for selectively connecting said opening either to a water source for supplying water to said receptacle or to a drain for emptying said receptacle, and control means operative after said agitator has been oscillated for a predetermined time for actuating said valve means to effect addition of water to said receptacle, the original water being flushed down through said hollow post and shaft.

5. In an automatic laundry machine, the combination comprising a stationary tub having a top opening closable by a water-tight lid, a hollow agitator shaft extending vertically upward through the bottom of said tub to a point below said lid and defining a drain passage from its top to its lower end, said shaft having an opening in its lower end adapted for connection to a drain, an agitator in the tub fixed on said shaft, motive means for driving said shaft and agitator, an opening defined in the bottom portion of the tub wall, valve means for connecting said opening to a water pressure source, and means for opening said valve means after said agitator has been driven for a predetermined period to add water to said tub, to thereby flush the original water down through said hollow shaft.

6. In an automatic laundry machine having a stationary tub of globe-like shape, an agitator in said tub, and means for driving said agitator, the combination of a flexible and resilient sleeve-like liner sealed at its marginal edges to overlie the interior side surface of said tub, said liner having corrugated folds in its upper portion permitting it to contract against said interior side surface, said liner also having a plurality of protuberances on its outer surface to prevent sticking to said surface, an opening defined in the side portion of the tub wall communicating with the space between said liner and said interior surface, an opening in the bottom portion of the tub wall, means for connecting said bottom opening to a drain, and means for supplying pressured water through said side opening to expand said liner into squeezing engagement with wet clothes in said tub to thereby extract water from said clothes for passage through said bottom opening.

7. In an automatic laundry machine for performing sequenced washing, rinsing, and extracting operations, the combination comprising a stationary tub of generally globe-like shape, a hollow shaft extending upwardly through the bottom of said tub and adapted to communicate at its lower end with a drain, an agitator in said tub on said shaft, means for driving said shaft and agitator, a flexible liner in the general shape of a sleeve inside said tub, said liner having its upper edge sealed around the top of said tub and its lower edge sealed around the lower inner surface of said tub, said liner defining a cavity between itself and the tub's wall, a plurality of pleat-like corrugations crimped in said liner to normally hold it substantially against the tub's wall, a plurality of protuberances on said liner to prevent its sticking to the tub's wall, a side opening defined in the wall of said tub communicating with the space between said tub and liner, a bottom opening defined in the wall of said tub, valves for selectively connecting said bottom and side openings either to a water pressure source or a drain, means for actuating said valves to fill said tub with water, a cam bank for controlling said valves and said driving means including a cam for opening one of said valves to add rinse water to said tub to thereby flush the original water through said hollow shaft, a cam for next causing said valves to connect said bottom opening to a drain and said side opening to a pressured water source, whereupon said liner is expanded by water pressure to squeeze clothes in said tub, the extracted water being drained through said bottom opening.

References Cited in the file of this patent

UNITED STATES PATENTS

| | | |
|---|---|---|
| 2,161,604 | Watts | June 6, 1939 |
| 2,265,516 | Chayie | Dec. 9, 1941 |
| 2,334,831 | Meyer et al. | Nov. 23, 1943 |
| 2,344,253 | Kirby | Mar. 14, 1944 |
| 2,449,634 | Baade | Sept. 21, 1948 |
| 2,453,707 | Graham | Nov. 16, 1948 |
| 2,593,292 | Cavgler | Apr. 15, 1952 |
| 2,647,385 | Candor | Aug. 14, 1953 |
| 2,652,709 | Bowen | Sept. 22, 1953 |
| 2,657,564 | Graham | Nov. 3, 1953 |
| 2,676,088 | Bilde et al. | Apr. 20, 1954 |
| 2,733,450 | Wallace | Feb. 7, 1956 |